United States Patent
Fukata

(10) Patent No.: US 9,286,556 B2
(45) Date of Patent: Mar. 15, 2016

(54) IMAGE FORMING APPARATUS

(71) Applicant: KYOCERA Document Solutions Inc., Osaka-shi (JP)

(72) Inventor: Takuya Fukata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/751,286

(22) Filed: Jun. 26, 2015

(65) Prior Publication Data

US 2015/0379385 A1 Dec. 31, 2015

(30) Foreign Application Priority Data

Jun. 27, 2014 (JP) ................. 2014-132381

(51) Int. Cl.
  *G06K 15/00* (2006.01)
  *G06F 3/12* (2006.01)

(52) U.S. Cl.
  CPC .............. *G06K 15/408* (2013.01); *G06F 3/121* (2013.01); *G06F 3/1235* (2013.01); *G06F 3/1239* (2013.01); *G06F 3/1259* (2013.01); *G06K 15/4065* (2013.01); *G06K 15/4075* (2013.01); *H04N 2201/0094* (2013.01)

(58) Field of Classification Search
  USPC ............................... 358/1.14, 1.15
  See application file for complete search history.

(56) References Cited

U.S. PATENT DOCUMENTS

| | | | | |
|---|---|---|---|---|
| 8,549,190 B2* | 10/2013 | Komano | ............... | G06F 3/1203 710/15 |
| 8,953,955 B2* | 2/2015 | Kogusuri | ............. | G03G 15/553 399/24 |
| 2014/0016154 A1* | 1/2014 | Ohmori | .............. | H04N 1/00278 358/1.13 |

FOREIGN PATENT DOCUMENTS

JP   2006-051615 A   2/2006
JP   2007-069534 A   3/2007

* cited by examiner

*Primary Examiner* — Allen H Nguyen
(74) *Attorney, Agent, or Firm* — Studebaker & Brackett PC

(57) ABSTRACT

In a situation in which an error detecting section detects occurrence of consumable exhaustion during execution of a print job involving multi-page printing and the consumable exhaustion is resolved, a job managing section specifies a user who has resolved the consumable exhaustion. Upon determining that a print job of the specified user is to be executed using a consumable of the same type as the consumable of which exhaustion has occurred, the job managing section inserts the print job of the specified user at an error pause point to cause the printer to perform printing of the print job of the specified user directly after resolution of the consumable exhaustion.

5 Claims, 5 Drawing Sheets

IMAGE FORMING APPARATUS

INCORPORATION BY REFERENCE

The present application claims priority under 35 U.S.C. §119 to Japanese Patent Application No. 2014-132381, filed Jun. 27, 2014. The contents of this application are incorporated herein by reference in their entirety.

BACKGROUND

The present disclosure relates to image forming apparatuses.

In image forming apparatuses, such as printers, multifunction peripherals, etc., an error may be caused due to exhaustion of a consumable, such as printing paper or toner, in printing. Alternatively, an error may be caused due to a jam. In such a situation, a user operates the apparatus to resolve the error (replenishment of a consumable, removal of jammed printing paper, or the like) in order that printing can resume.

A certain image forming apparatus executes after resolution of such an error, a print job of a user who has resolved the error in a preferential manner.

SUMMARY

An image forming apparatus according to the present disclosure includes a printer, an error detection section, and a job managing section. The printer performs printing using a consumable according to a print job. The error detection section detects occurrence of consumable exhaustion and a consumable of which exhaustion occurs and detects resolution of the consumable exhaustion by a user. In a situation in which the error detecting section detects occurrence of consumable exhaustion during execution of a print job involving multipage printing, the job managing section: upon the error detecting section detecting resolution of the consumable exhaustion, specifies a user who has resolved the consumable exhaustion; determines whether or not a print job of the specified user is to be executed using a consumable of the same type as the consumable of which exhaustion has occurred; upon determining that the print job of the specified user is to be executed using the consumable of the same type as the consumable of which exhaustion has occurred, inserts the print job of the specified user at an error pause point at which the print job being executed when occurrence of the consumable exhaustion is detected is suspended, to cause the printer to perform printing of the print job of the specified user directly after resolution of the consumable exhaustion; and upon determining that the print job of the specified user is not to be executed using the consumable of the same type as the consumable of which exhaustion has occurred, inserts the print job of the specified user subsequent to the print job being executed when occurrence of the consumable exhaustion is detected to cause the printer to perform printing of the print job of the specified user subsequent to the print job being executed when occurrence of the consumable exhaustion is detected.

DETAILED DESCRIPTION

An embodiment of the present disclosure will be described below with reference to the accompanying drawings.

Figure 1:
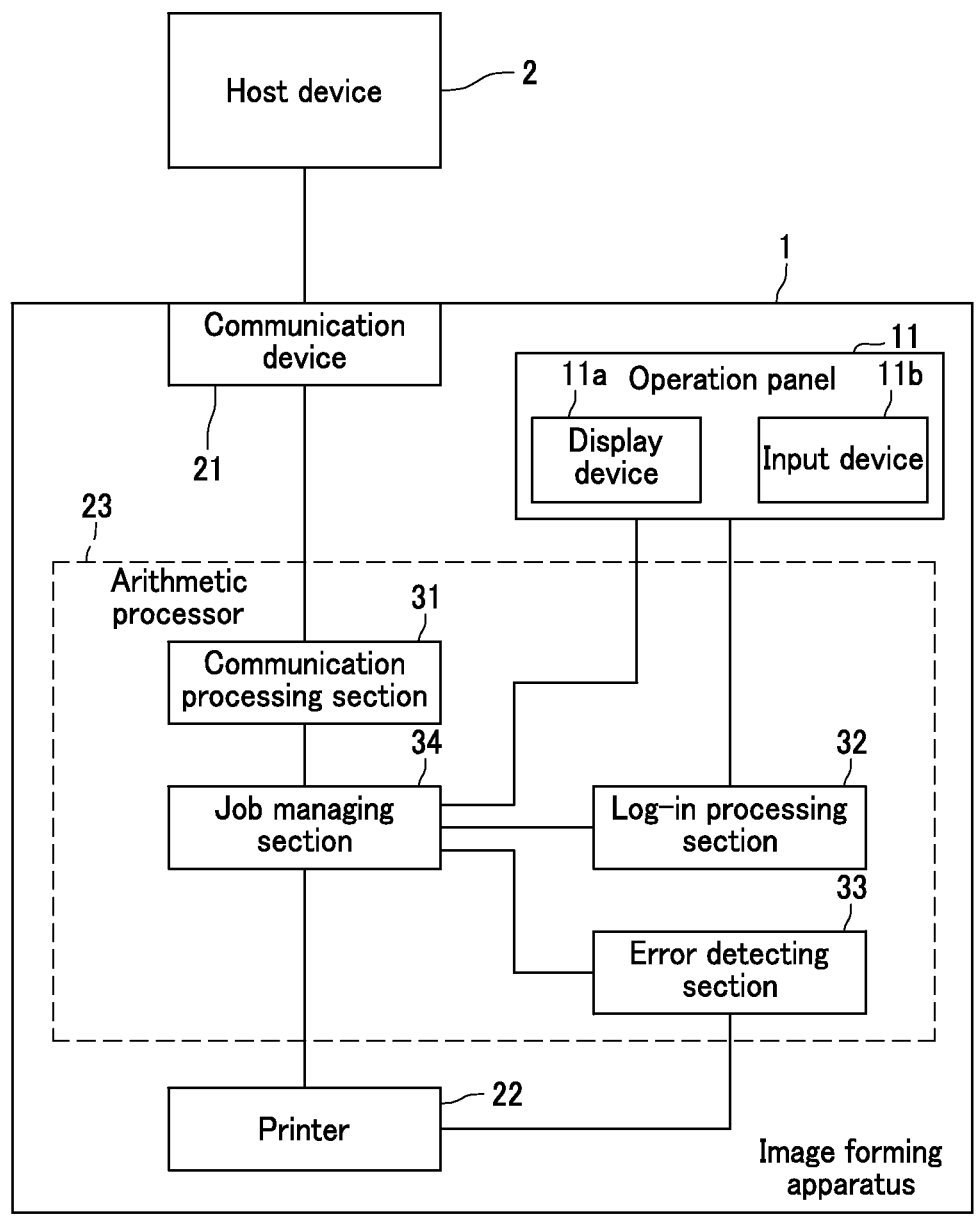
FIG. 1 is a block diagram illustrating a configuration of an image forming apparatus according to an embodiment of the present disclosure.

FIG. 1 is a block diagram illustrating a configuration of an image forming apparatus according to an embodiment of the present disclosure.

An image forming apparatus 1 has a function of user authentication and stores a user ID for each of a plurality of registered users. In a situation in which the user authentication function is turned on, the image forming apparatus 1 performs printing or the like after user authentication using the user IDs.

The image forming apparatus 1 is connected to a host device 2 via a network or the like. The host device 2 may be a personal computer, for example. The host device 2 transmits print data to the image forming apparatus 1 for printing an image that a user desires.

In response to a user operation on the host device 2 for causing the image forming apparatus 1 to perform printing, a driver in the host device 2 adds a user ID to print data (e.g., page description language (PDL) data). The host device 2 then transmits the print data with the user ID to the image forming apparatus 1. The image forming apparatus 1 specifies the user according to the user ID added to the print data.

Alternatively, in response to a user operation on the image forming apparatus 1 for causing the image forming apparatus 1 to perform printing, the image forming apparatus 1 specifies the user according to a user ID input at user log-in.

The image forming apparatus 1 includes an operation panel 11, a communication device 21, a printer 22, and an arithmetic processor 23.

The operation panel 11 includes a display device 11a such as a liquid crystal display, and an input device 11b such as a touch panel. The operation panel 11 displays an operation screen to a user. The operation panel 11 detects a user operation.

The communication device 21 is connectable to the host device 2 via the network or the like. The communication device 21 performs data communication in accordance with a prescribed communication protocol.

The printer 22 is an internal device that performs printing using consumables (toner, printing paper, etc.) according to a print job.

The arithmetic processor 23 is a computer including a central processing unit (CPU), a read only memory (ROM), a random access memory (RAM), etc. that are not illustrated. The arithmetic processor 23 loads programs stored in the ROM or the like onto the RAM and causes the CPU to execute the programs. In this manner, various processing sections are implemented.

In the present embodiment, a communication processing section 31, a log-in processing section 32, an error detecting section 33, and a job managing section 34 are implemented in the arithmetic processor 23.

The communication processing section 31 controls the communication device 21. The communication processing section 31 executes data communication with the host device 2 via the communication device 21 in accordance with a prescribed protocol.

The log-in processing section 32 performs user log-in and log-out. User log-in and log-out are performed in response to user operations on the operation panel 11.

The error detecting section 33 detects occurrence of consumable exhaustion that represents exhaustion of any consumable that the printer 22 uses, and a consumable of which exhaustion occurs. The error detecting section 33 further detects the consumable exhaustion having been resolved by a user replenishing the consumable of which exhaustion has occurred with a consumable of the same type.

The job managing section 34 receives requests according to user operations on the operation panel 11 and print data transmitted from the host device 2. The job managing section 34 generates print jobs based on the received requests and print data. The job managing section 34 causes the printer 22 to perform printing according to the generated print jobs in a sequential manner.

In a situation in which the error detecting section 33 detects occurrence of consumable exhaustion during execution of a print job involving multi-page printing and the error detecting section 33 detects resolution of the consumable exhaustion, the job managing section 34 specifies a user who has resolved the consumable exhaustion. The job managing section 34 then determines whether or not a print job of the specified user is to be executed using a consumable of the same type as the consumable of which exhaustion has occurred. Upon determining that the print job of the specified user is to be executed using a consumable of the same type as the consumable of which exhaustion has occurred, the job managing section 34 inserts the print job of the specified user at an error pause point (a point in the print job at which the print job is suspended due to the detected consumable exhaustion) to cause the printer 22 to perform printing of the print job of the specified user directly after resolution of the consumable exhaustion. By contrast, upon determining that the print job of the specified user is not to be executed using a consumable of the same type as the consumable of which exhaustion has occurred, the job managing section 34 causes the printer 22 to resume printing from a page in the print job in which occurrence of the consumable exhaustion is detected. In other words, the job managing section 34 inserts the print job of the specified user subsequent to the print job in which occurrence of the consumable exhaustion is detected to cause the printer 22 to perform printing of the print job of the specified user subsequent to the print job in which occurrence of the consumable exhaustion is detected.

The job managing section 34 in the present embodiment specifies as a user who has resolved the consumable exhaustion, a user who currently logs in through the log-in processing section 32 at a time when the error detecting section 33 detects resolution of the consumable exhaustion.

The job managing section 34 in the present embodiment further receives print data with user IDs of any of the registered users. The job managing section 34 places the received print data as print jobs in a queue in an order of receipt. To place in a queue hereinafter may be referred to as to queue. The job managing section 34 changes the order of the queue to advance the print job of the specified user who has resolved consumable exhaustion.

Figure 2:
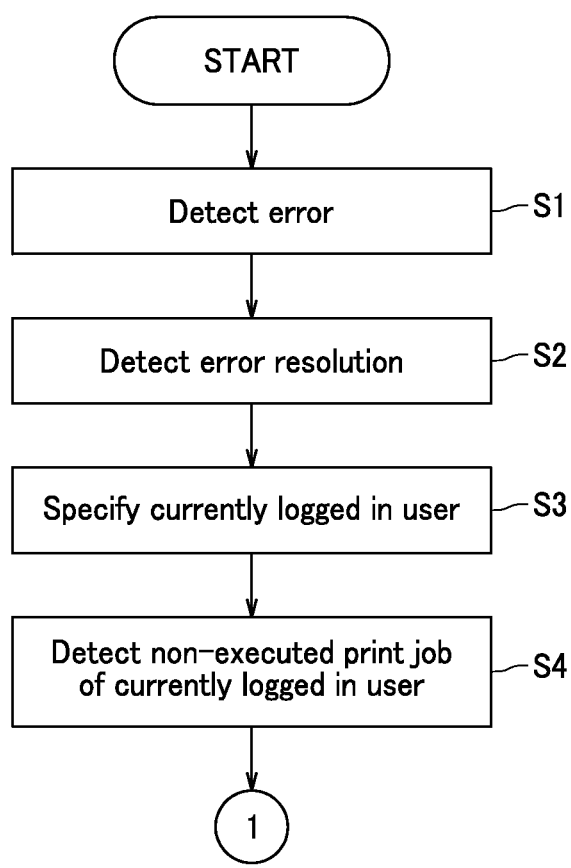
FIG. 2 is a flowchart depicting an operation of the image forming apparatus illustrated in FIG. 1 in error resolution.
Figure 3:
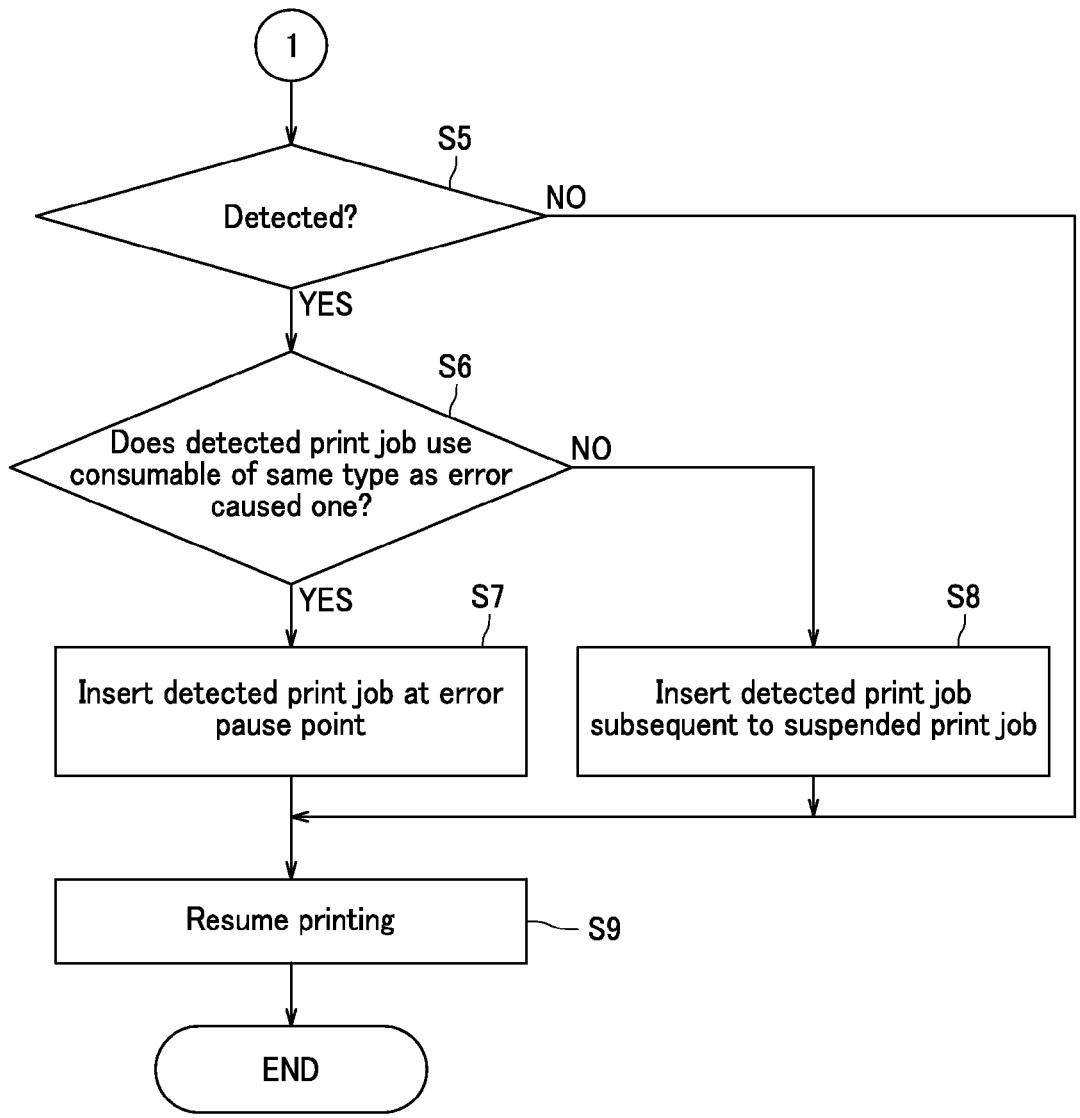
FIG. 3 is a flowchart depicting an operation of the image forming apparatus illustrated in FIG. 1 in error resolution.

Description will be made next about an operation of the image forming apparatus 1. FIGS. 2 and 3 are flowcharts depicting an operation of the image forming apparatus 1 illustrated in FIG. 1 in error resolution.

In response to receipt of requests according to user operations through the operation panel 11 and print data transmitted from the host device 2, the job managing section 34 generates print jobs. The job managing section 34 then queues the generated print jobs in an order of receipt.

Unless occurrence of an error is detected in the printer 22, the job managing section 34 causes the printer 22 to perform printing of the print jobs in the order of receipt.

By contrast, upon the error detecting section 33 detecting an error during printing (Step S1), the job managing section 34 suspends printing and causes the operation panel 11 to display an error message. The job managing section 34 then waits for detection of error resolution by the error detecting section 33.

When the error detecting section 33 detects error resolution (Step S2), the job managing section 34 specifies a currently logged in user as a user who has resolved the error by replacing a toner container, replenishing printing paper, or the like (Step S3).

Note that the currently logged in user at the time when the error detecting section 33 detects error resolution is a user who has been logged in since before error detection or a user who has been logged in for the purpose of error resolution after error detection.

The job managing section 34 next detects a non-executed print job of the currently logged in specified user among the print jobs in a queue (Step S4).

Upon detecting a non-executed print job of the specified user among the print jobs in the queue (Yes at Step S5), the job managing section 34 then determines whether or not the detected print job is to be executed using a consumable of the same type as a consumable of which exhaustion has caused the error (Step S6).

For example, in a situation in which the error is caused due to exhaustion of A4-size printing paper, the job managing section 34 specifies a user who is logged in at the time when the error is resolved by replenishing A4-size printing paper. The job managing section 34 next determines whether or not the print job of the currently logged in specified user is to be executed using A4-size printing paper.

Upon determining that the detected print job is to be executed using a consumable of which exhaustion has caused the error (Yes at S6), the job managing section 34 then inserts the detected print job at the error pause point (Step S7).

By contrast, upon determining that the detected print job is not to be executed using a consumable of which exhaustion has caused the error (No at S6), the job managing section 34 inserts the detected print job subsequent to the print job suspended due to the error.

After the job managing section 34 inserts the print job of the user who has resolved the error at the error pause point or subsequent to the print job suspended due to the error as above, printing is resumed (Step S9). Note that in the absence of a print job of the user who has resolved the error (No at Step S5), the processing at Steps S7 and S8 is not executed.

The user who is logged in for the purpose of error resolution is logged out after printing resumes.

A specific example of the operation of the image forming apparatus 1 in error resolution will be described next with reference to FIGS. 4 and 5.

Figure 4:
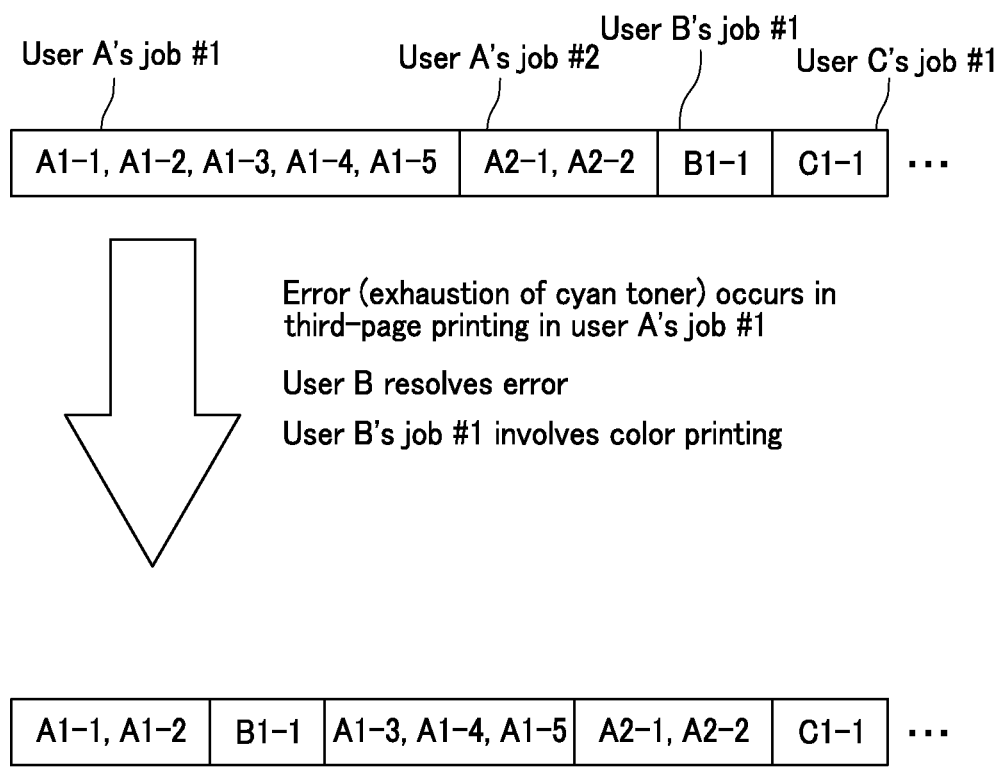
FIG. 4 is a diagram illustrating an example of job order change in error resolution in the image forming apparatus illustrated in FIG. 1.

FIG. 4 is a diagram illustrating an example of job order change in error resolution in the image forming apparatus 1 illustrated in FIG. 1. FIG. 5 is a diagram illustrating another example of job order change in error resolution in the image forming apparatus illustrated in FIG. 1. In FIGS. 4 and 5, a print job #i of a user A is represented by Ai and a j-th page in the print job #i is represented by Ai-j.

Figure 5:
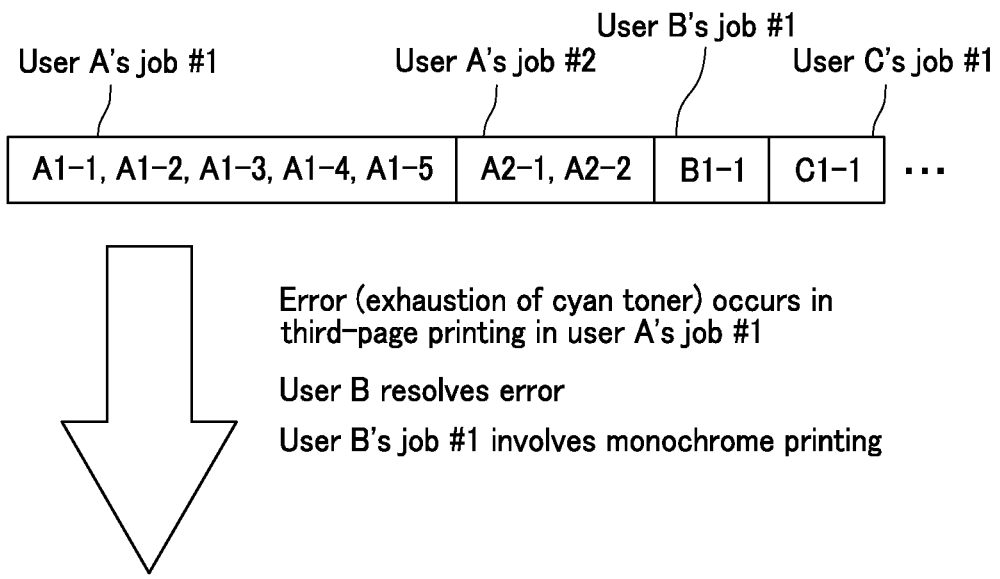
FIG. 5 is a diagram illustrating another example of job order change in error resolution in the image forming apparatus illustrated in FIG. 1.

In the examples illustrated in FIGS. 4 and 5, a user A's print job #1, a user A's print job #2, a user B's print job #1, and a user C's print job #1 are queued. The user A's print job #1 involves 5-page printing of print data. The user A's print job #2 involves 2-page printing of print data. The user B's print job #1 involves 1-page printing of print data. The user C's print job #1 involves 1-page printing of print data.

With reference to FIG. 4, an operation of the job managing section 34 in error resolution will be described first. In FIG. 4, it is supposed that an error is caused due to exhaustion of cyan toner in third-page printing in the user A's print job #1 and the user B (i.e., a different user to the user A) resolves the error by replacing a cyan toner container.

As illustrated in FIG. 4, when the user B's print job #1 is a print job involving color printing, specifically, a print job using cyan toner, the job managing section 34 inserts the user B's print job #1 at an error pause point preceding the third-page printing in the user A's print job #1 (Step S7 in FIG. 3). Accordingly, printing of the user B's print job #1 is performed directly after error resolution, and then the third-to-fifth-page printing in the user A's print job #1 is performed.

With reference next to FIG. 5, an operation of the job managing section 34 in error resolution will be described by referring to an example in which an error is caused due to exhaustion of cyan toner in third-page printing in the user A's print job #1 and the user B different from the user A resolves the error by replacing a cyan toner container.

As illustrated in FIG. 5, when the user B's print job #1 is a print job involving monochrome printing, in other words, a print job not using cyan toner, the job managing section 34 inserts the user B's print job #1 subsequent to the user A's print job #1 (see Step S8 in FIG. 3). Accordingly, third-to-fifth-page printing in the user A's print job #1 is performed directly after error resolution and printing of the user B's print job #1 is performed subsequent to the user A's print job #1.

Note that in a situation in which an error is caused due to exhaustion of cyan toner in third-page printing in the user A's print job #1 and the user C different from the user A resolves the error by replacing a cyan toner container in the example illustrated in FIG. 5, when the user C's print job #1 is a print job involving color printing, specifically, a print job using cyan toner, the job managing section 34 inserts the user C's print job #1 at the error pause point preceding the third-to-fifth-page printing in the user A's print job #1 (see Step S7 in FIG. 3). Accordingly, the user C's print job #1 is executed directly after error resolution, and then the third-to-fifth-page printing in the user A's print job #1 is performed. By contrast, when the user C's print job #1 is a print job involving monochrome printing, in other words, a print job not using cyan toner, the job managing section 34 inserts the user C's print job #1 subsequent to the user A's print job #1 suspended due to the error (see Step S8 in FIG. 3). Accordingly, third-to-fifth-page printing in the user A's print job #1 is performed directly after error resolution and the user C's print job #1 is executed subsequent to the user A's print job #1.

As described above, in a situation in which the error detecting section 33 detects occurrence of consumable exhaustion during execution of a print job involving multi-page printing, the job managing section 34 specifies a user who has resolved the consumable exhaustion upon the error detecting section 33 detecting resolution of the consumable exhaustion. The job managing section 34 then determines whether or not a print job of the specified user is to be executed using a consumable of the same type as the consumable of which exhaustion has occurred. Upon determining that the print job of the specified user is to be executed using the consumable of the same type as the consumable of which exhaustion has occurred, the job managing section 34 inserts the print job of the specified user at an error pause point to cause the printer 22 to perform printing of the print job of the specified user directly after resolution of the consumable exhaustion. By contrast, upon determining that the print job of the specified user is not to be executed using the consumable of the same type as the consumable of which exhaustion has occurred, the job managing section 34 causes the printer 22 to resume printing from a page in the print job at which occurrence of the consumable exhaustion is detected. In other words, the job managing section 34 inserts the print job of the specified user subsequent to the print job being executed when occurrence of the consumable exhaustion is detected to cause the printer 22 to perform printing of the print job of the specified user subsequent to the print job being executed when occurrence of the consumable exhaustion is detected.

In the configuration as above, page consecutiveness can be maintained as far as possible in resolution of an error caused due to consumable exhaustion in the image forming apparatus 1. Further, a user who has resolved the error caused due to consumable exhaustion can be prevented from experiencing again identical consumable exhaustion before execution of the user's job.

For example, when a toner container in which occurrence of toner exhaustion is detected is detached, shaken, and reattached, the toner exhaustion may be resolved. Alternatively, when a small amount of printing paper is replenished upon detection of paper exhaustion, an error due to paper exhaustion may be resolved.

When a user resolves an error in either of the above manners, it is highly probable that an error due to exhaustion of a consumable of the same type occurs within a short period of time. However, in the present disclosure, in a situation in which a print job of the user who has resolved such an error is to be executed using a consumable of the same type as that of which the exhaustion has caused the error, the print job of the user who has resolved the error is executed directly after error resolution. In the configuration as above, the user who has resolved the error can be prevented from experiencing again an error caused due to exhaustion of a consumable of the same type before execution of the user's print job.

Although the above embodiment is a preferable example of the present disclosure, the present disclosure is not limited to the embodiments and a variety of alterations and variations are possible within the scope not deviating from the subject matter of the present disclosure.

What is claimed is:
1. An image forming apparatus comprising:
 a printer configured to perform printing using a consumable according to a print job;
 an error detecting section configured to detect occurrence of consumable exhaustion and a consumable of which exhaustion occurs and detect resolution of the consumable exhaustion by a user; and
 a job managing section, wherein
 in a situation in which the error detecting section detects occurrence of consumable exhaustion during execution of a print job involving multi-page printing, the job managing section:
  upon the error detecting section detecting resolution of the consumable exhaustion, specifies a user who has resolved the consumable exhaustion;
  determines whether or not a print job of the specified user is to be executed using a consumable of the same type as the consumable of which exhaustion has occurred;

upon determining that the print job of the specified user is to be executed using the consumable of the same type as the consumable of which exhaustion has occurred, inserts the print job of the specified user at an error pause point at which the print job being executed when occurrence of the consumable exhaustion is detected is suspended, to cause the printer to perform printing of the print job of the specified user directly after resolution of the consumable exhaustion; and upon determining that the print job of the specified user is not to be executed using the consumable of the same type as the consumable of which exhaustion has occurred, inserts the print job of the specified user subsequent to the print job being executed when occurrence of the consumable exhaustion is detected to cause the printer to perform printing of the print job of the specified user subsequent to the print job being executed when occurrence of the consumable exhaustion is detected.

2. The image forming apparatus according to claim 1, further comprising:

an operation panel; and a log-in processing section configured to perform user log-in and log-out processing according to user operations on the operation panel, wherein when the error detecting section detects resolution of the consumable exhaustion, the job managing section specifies a user who is currently logged in through the log-in processing section as a user who has resolved the consumable exhaustion.

3. The image forming apparatus according to claim 1, wherein the job managing section receives pieces of print data each with a user ID of any of a plurality of users, places the print data as print jobs in a queue in an order of receipt, and changes the order of the queue to advance the print job of the user who has resolved the consumable exhaustion.

4. The image forming apparatus according to claim 3, wherein the job managing section detects a non-executed print job of the specified user among the print jobs in the queue, and upon detecting the non-executed print job of the specified user, the job managing section changes the order of the queue to insert the detected non-executed print job at the error pause point or subsequent to the print job being executed when occurrence of the consumable exhaustion is detected.

5. The image forming apparatus according to claim 1, wherein the consumable is toner or printing paper.

* * * * *